United States Patent
Kaag

(10) Patent No.: US 10,880,229 B2
(45) Date of Patent: Dec. 29, 2020

(54) MANAGING NETWORK TRAFFIC IN APPLICATION CONTROL NETWORKS

(71) Applicant: SIGNIFY HOLDING B.V., Eindhoven (NL)

(72) Inventor: Bjorn Christiaan Wouter Kaag, Heerlen (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 21 days.

(21) Appl. No.: 16/072,761

(22) PCT Filed: Jan. 20, 2017

(86) PCT No.: PCT/EP2017/051136
§ 371 (c)(1),
(2) Date: Jul. 25, 2018

(87) PCT Pub. No.: WO2017/129476
PCT Pub. Date: Aug. 3, 2017

(65) Prior Publication Data
US 2019/0036839 A1    Jan. 31, 2019

(30) Foreign Application Priority Data
Jan. 29, 2016    (EP) ..................... 16153303

(51) Int. Cl.
*H04L 12/927* (2013.01)
*H04L 12/815* (2013.01)
(Continued)

(52) U.S. Cl.
CPC ............ *H04L 47/803* (2013.01); *H04L 47/19* (2013.01); *H04L 47/22* (2013.01); *H04L 67/125* (2013.01); *H04L 45/64* (2013.01)

(58) Field of Classification Search
None
See application file for complete search history.

(56) References Cited

U.S. PATENT DOCUMENTS

2006/0092841 A1*    5/2006    Lloyd ..................... H04L 43/00
                                                                370/231
2012/0116724 A1    5/2012    Takara et al.
(Continued)

FOREIGN PATENT DOCUMENTS

CN    102427593 A    4/2012

OTHER PUBLICATIONS

Teklemariam et al. "Facilitating the creation of IoT applications through conditional observations in CoAP." EURASIP Journal on Wireless Communications and Networking 2013. (Year: 2013).*

(Continued)

*Primary Examiner* — Scott B Christensen
(74) *Attorney, Agent, or Firm* — Patrick T. Driscoll

(57) ABSTRACT

The present invention relates to a system and method for controlling data traffic within an applications control network (300) comprising a plurality of data forwarding devices (110, 180) capable of transmitting data at a first frequency within an integrated communication network (100) and at least one application control component (310) that transmits data to the network at the first frequency. The system comprises a processing unit configured to determine, based on an application plan (204), a second frequency at which the data from the application control component (310) is required by the application control network, provide a data path configuration for the plurality of data forwarding devices for passing the data at instances of time defined by the second frequency, wherein the second frequency is less than the first frequency, and for blocking the data path during the time interval between the time instances defined by the second frequency.

14 Claims, 5 Drawing Sheets

(51) Int. Cl.
  *H04L 12/801*  (2013.01)
  *H04L 29/08*  (2006.01)
  *H04L 12/715*  (2013.01)

(56) References Cited

U.S. PATENT DOCUMENTS

2014/0185503 A1    7/2014  Roy
2014/0293993 A1   10/2014  Ryhorchuk
2015/0200846 A1*   7/2015  Hui .................. H04L 45/70
                                                  370/253
2017/0070426 A1*   3/2017  Chen ................ H04L 45/44
2017/0111282 A1*   4/2017  Chen ................ H04L 12/4633

OTHER PUBLICATIONS

Yanwen Wang, et al., "An Energy-Efficient SDN Based Sleep Scheduling Algorithm for WSNS," Journal of Network and Computer Applications, 2015 (7 Pages).

Girum Ketema Teklemariam, et al., "Facilitating the Creation of IOT Applications Through Conditional Observations in COAP," EURASIP Journal on Wireless Communications and Networking, 2013 (19 Pages).

* cited by examiner

MANAGING NETWORK TRAFFIC IN APPLICATION CONTROL NETWORKS

CROSS-REFERENCE TO PRIOR APPLICATIONS

This application is the U.S. National Phase application under 35 U.S.C. § 371 of International Application No. PCT/EP2017/051136, filed on Jan. 20, 2017, which claims the benefit of European Patent Application No. 16153303, filed on Jan. 29, 2016. These applications are hereby incorporated by reference herein.

FIELD OF THE INVENTION

The present invention relates to application control networks, in particular—but not limited to—lighting control networks. The present invention is dedicated to managing network traffic in accordance with application specific requirements, in particular, optimizing the traffic amount and network availability.

BACKGROUND OF THE INVENTION

In legacy managed data networks such as Ethernet (like) networks and/or IP networks, all communication links trough the network are granted unconditionally, so the communication data, e.g. transmitted from one end node to another, will flow everywhere unless restricted by firewalls or data path definitions which are programmed by hand into data forwarding devices, i.e. (wireless) Access Points, routers and data switches. US 2015/02000846 discloses a network with high and low data rate network components. If a network components determines that its neighbor component is not capable of communicating at high data rates, the network component uses the low data rate to transmit data to that neighboring network component.

A new, state of the art concept of software defined networks introduces programmability of data paths through the network by enabling a remote control plane in software to configure the hardware of the data plane in said data forwarding devices. A Software Defined Networking (SDN) system may dynamically configure the data paths between data ports of a plurality of data forwarding devices within a communication network.

In modern application control networks, such as but not limited to—lighting control networks, network management systems, such as—but not limited to—SDN systems dynamically control communication paths through the communication backbone network underlying the application network. When using a SDN system as management system, a properly programmed SDN controller is capable of automatically selecting for instance the path with the least number of data forwarding devices with the best quality of service out of the multiple paths available in the communication mesh network between the end nodes, and will program the correct filters to pass data through the network. However, an SDN system in itself does not have context knowledge about a (lighting) application that is controlled via the programmed data paths. Thus, communication paths are selected independently of application layer specific requirements.

In software defined application control networks a Software Defined Application (SDA) system analyses the application scenes to be realized in the application network. Together with information about the available network topology provided by the SDN system, optimized paths through the network may be selected.

Modern application control networks for controlling sensors and actuators of an application typically attempt to limit the amount of data that is transmitted over the control network by implementing restful interfaces. This means that any actuator interested in the data of a particular sensor needs to specifically formulate and transmit messages to the respective sensor to obtain said data. In other words, the sensor only transmits its data when asked to do so. There are, however, also special circumstances, in which the sensor may broadcast data without being interrogated and thus, constantly transmitting data over the application network. Examples are in general sensors without a restful interface, or sensors for applications that generate frequent updates like for example—but not limited to—temperature sensors, presence detectors, clock time signals, power status, rpm of motors, etc. The constant data transmission can cause several problems. In energy efficient networks a constant reporting of sensor data broadcasted over the communication network may refresh the countdown timers of all network components involved in data forwarding, e.g. switches, routers, gateways, etc. The countdown timers, thus, never expire such that the data forwarding components may never enter a low power state. Depending on the application controlled by an application control network, it may not be required to receive the sensor signal data as frequently, as it is provided by a particular sensor. If, as an example, the application system needs signal data once a day, but the sensor is broadcasting data every second, performance of the applications control network suffers from the frequency mismatch.

SUMMARY OF THE INVENTION

It is thus, an object of the present invention to provide an improved application control system that may reduce unnecessary network traffic while maintaining the application functionality of an application control network.

The object is achieved by a system, method and computer program according to the independent claims. Further preferred embodiments are defined by the dependent claims.

In an aspect of the invention there is provided a system for controlling data traffic within an applications control network comprising a plurality of data forwarding devices within an integrated communication network and at least one application control component that transmits data to the network at a first reporting frequency of the at least one application control component. The system comprises a processing unit configured to determine, based on an application plan, a second reporting frequency at which the data from the application control component is required by the application control network for operation of the application, provide a data path configuration for the plurality of data forwarding devices for passing the data at instances of time defined by the second reporting frequency, wherein the second reporting frequency is less than the first reporting frequency, and for blocking the data path during the time interval between the time instances defined by the second reporting frequency. The second reporting frequency being less than the first reporting frequency means that time instances defined by the first reporting frequency occur more often than time instances defined by the second reporting frequency.

By deriving a schedule in accordance with an application plan it is possible to dynamically program a data path definition to the point in the control network where the data is blocked best. This point may be the data port of a data forwarding device an application control component, such as a sensor end node, is communicatively coupled to. In that case, the path is blocked immediately at its beginning. Alternatively, the path may be blocked at any other data port in the network along the data path. To derive a schedule for efficient data path definitions the context in which an end node within the network is used is taken into account. The system may dynamically determine the update frequency requirement as defined by a respective application scene stipulating the interaction between a sensor and actuator. Exploiting the information from the context how a respective end node is used, the system defines a schedule to allow its data to be passed or ignored according to certain time windows. Subsequently the network management system commands periodical (un)blocking of respective data ports of data forwarding device. The periodic data path definition effectively defines a frequency transformation gateway. If desired by the application, it defines a time window of limited duration to allow data passing and otherwise drops the data at the data port of a data forwarding device.

In a preferred embodiment the processing unit is configured to block the data path by configuring a data port of a data forwarding device to deactivate consultation with a network management control system.

In networks controlled by a network management system, data path definitions may be programmed by the network management system to respective data forwarding devices for data originating from and/or addressed to a particular node within the network. These path definitions may be programmed in a dynamic manner. In cases where there is no data path definition found or a data message received via a data port of the data forwarding device, the data forwarding device usually consults the network management system. In order to block certain data paths for a predetermined duration of time, consultations of the network management system may be disabled such that the data path definition will not be provided and the respective data message will not be sent, e.g. the data message may time out or may actively be dumped.

In a preferred embodiment the processing unit is configured to block the data path by configuring a data port of a data forwarding device to drop data arriving at the data port when originating from the application control component.

In a preferred embodiment configuring a data port of a data forwarding device to drop data comprises deleting a data path configuration and configure the data port to ignore data for which no data path configuration exists. In case a preexisting data path definition is present for a respective port of a data forwarding device, blocking the data port may be achieved by actively removing the data path definition and program the data forwarding device to ignore data messages for which no data path definition exists.

In a preferred embodiment the data forwarding device is the data forwarding device to which the application control component is directly communicatively coupled. Communicatively coupled comprises wired or wireless coupling to the data forwarding device. Blocking a data path directly at the first data forwarding device an application control component is coupled to, enables number of intermediate data forwarding devices on the data path to the network management system to switch to a low power mode, since they are not needed.

In a preferred embodiment the processing unit is further configured to periodically update information on (i) the available data paths through the communication network, and/or (ii) changes in the application plan. In dynamic networks, such as power efficient networks where different network components may be set to a low power mode, the available data paths may change over time. These changes can be monitored and respective updates to the path definitions could be made. Alternatively, or in addition new application scenes could be learned, e.g. via self-learning mechanisms using monitored operation or training data, or additional external application scenes could be provided. The new application scenes may be updated periodically and the path definitions should be updated accordingly.

In an aspect of the invention there is provided a method for controlling data traffic within an applications control network comprising a plurality of data forwarding devices within an integrated communication network and at least one application control component that transmits data to the network at a first reporting frequency of at least one application control component. The method comprises determining, based on an application plan, a second reporting frequency at which the data from the application control component is required by the application control network for operation of the application, providing a data path configuration for the plurality of data forwarding devices for passing the data at instances of time defined by the second reporting frequency and wherein the second reporting frequency is less than the first reporting frequency, and for blocking the data path during the time interval between the time instances defined by the second reporting frequency.

In a preferred embodiment blocking a data path comprises configuring a data port of a data forwarding device to deactivate consultation with a network management control system.

In a preferred embodiment blocking a data path comprises configuring a data port of a data forwarding device to drop data arriving at the data port when originating from the application control component.

In a preferred embodiment configuring a data port of a data forwarding device to drop data comprises deleting a data path configuration and configure the data port to ignore data for which no data path configuration exists.

In a preferred embodiment the data forwarding device is the data forwarding device to which the application control component is directly communicatively coupled (communicatively coupled comprises wired or wireless).

In a preferred embodiment the method further comprises periodically updating information on (i) the available data paths through the communication network, and/or (ii) changes in the application plan.

In an aspect of the invention there is provided a computer program for controlling data traffic within an applications control network comprising a plurality of data forwarding devices within an integrated communication network and at least one application control component that transmits data to the network at a first frequency (without being interrogated), the computer program being executable in an processing unit, the computer program comprising program code means for causing the processing unit to carry out a method as defined by the method of the previous aspect of the invention when the computer program is executed in the processing unit.

It shall be understood that the system of claim 1, the method of claim 7 and the computer program of claim 13 have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Some embodiments are exemplary described in the context of lighting control applications as preferred embodiments. However, it is to be understood that the embodiments are not restricted to lighting control applications. The person skilled in the art will appreciate that the methods and systems may be exploited for any other application control network requiring a similar system topology.

In the following a software defined application (SDA) system provides knowledge about application specific requirements and instructions as stipulated in an application plan comprising one or more application scenes. For instance, an example of an SDA system is a software defined lighting (SDL) system that defines a lighting plan comprising one or more lighting scenes. A lighting scene may for example define dependencies or interactions between application control components, e.g. which lamps are to be switched on, if a particular sensor is triggered. The lighting scenes may be defined for specific timeslots, such as day or night, weekdays, weekends, and so on.

A network management system such as a software defined networking (SDN) system provides knowledge about the respective network components present in a mesh network constituting the backbone network of the application control network and may control configuration of forwarding tables and the like. However, the network management system does not know about application specific connections between certain network components.

Together the SDA system and the network management system constitute a software defined control (SDC) system which combines both layers (application and network). The SDC system maps the application/lighting components onto the network topology and, thus, has the knowledge to decide which network components or component parts may be switched off without degrading the capability of the (lighting) control network to execute a (lighting) application.

Figure 1:
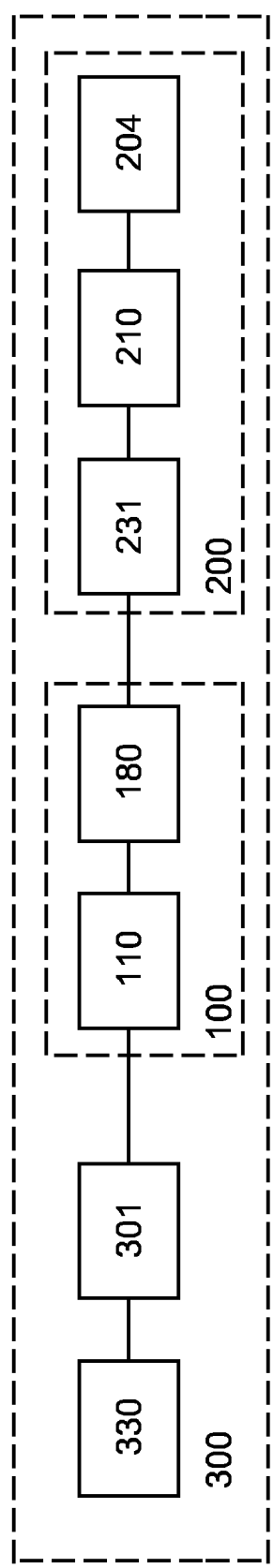
FIG. 1 shows a domain model of a software defined lighting controlled network.

FIG. 1 illustrates a domain model of an application control network 300 as a preferred embodiment of the present invention. SDA system 210 managing application plan 204 and the application scenes stipulated therein is comprised in SDC system 200 which can consult a network management system 231 and dynamically configure communication paths 180 through a communication network 100 to a data port of a border network component 110 that is connected to an application control component 301, such as a sensor end node. An (optional) energy source or energy storage 330 provides power to the sensor end node 301, if the border network component 110 does not provide power to the end node 301, e.g. via Power over Ethernet (PoE).

Figure 2A:
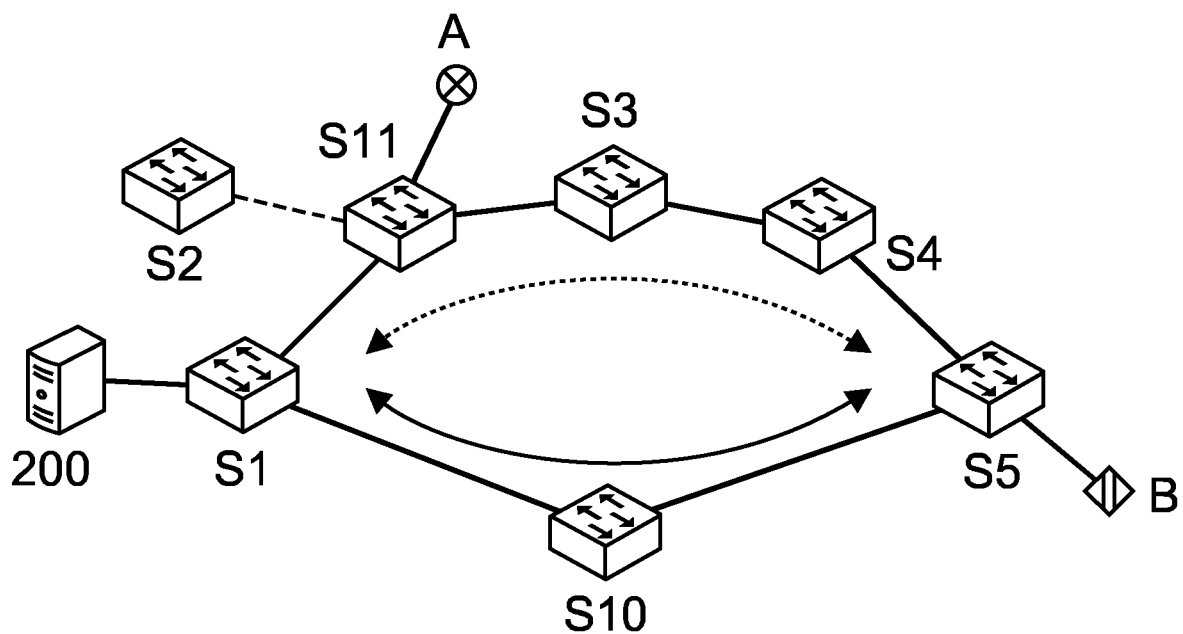
FIGS. 2a and 2b show an exemplary network topology in which embodiments of the present invention could be implemented.
Figure 2B:
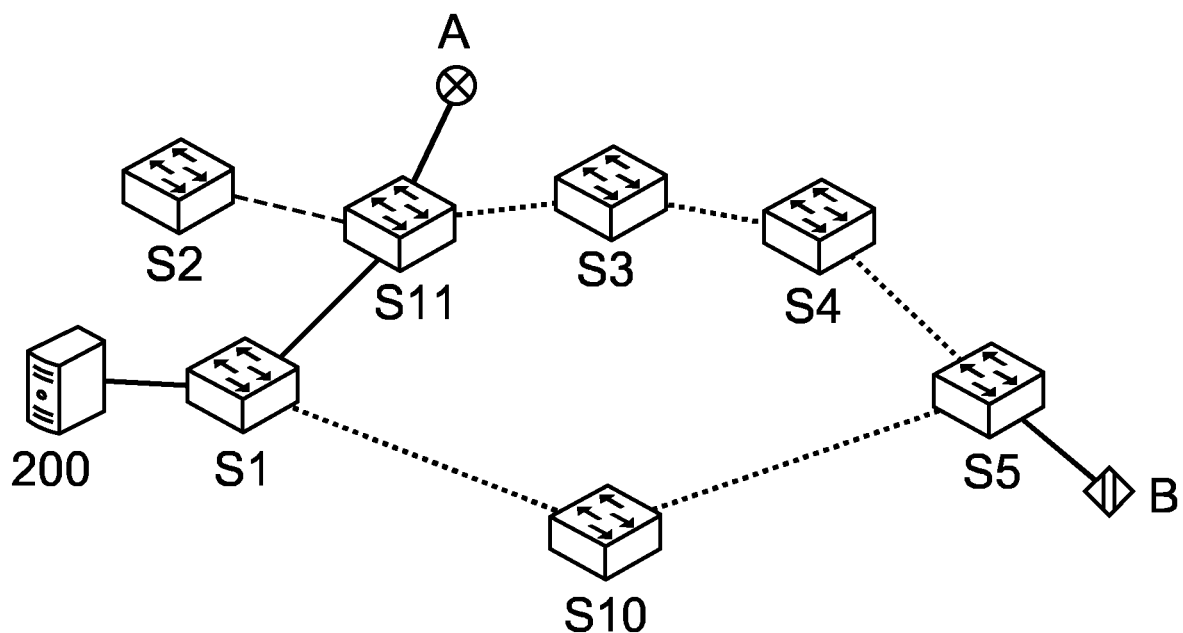

FIG. 2a shows an exemplary network topology. As application control components 301, there is a sensor B, such as a presence infrared sensor, and a light A, e.g. installed in the hall of a building, wherein the sensor B is creating a signal every few seconds while the light A is supposed to be always on during a predetermined period in time. Hence, the sensor data would not be required during this period. The sensor B is connected to data forwarding device S5, e.g. a data switch, and its data is transmitted through the entire network to SDC system 200 either via data forwarding devices S10 and S1 or via S4, S3, S11 and S1. Only data forwarding device S2 is not required in this application scene and may be switched to a low power state. Even if the system is capable of selecting one of the paths, for instance by selecting the path with the least number of data forwarding devices, e.g. path along S1, S10 to S5, this path would regularly be used for data transmission of sensor B. None of the data forwarding devices along the path would be capable of going to a low power state. In FIG. 2b, the control system according to a preferred embodiment of the present invention has determined the context of the sensor and blocks its data transmission during periods when the signal information is not required by the application control network. After the SDC 200 has dynamically re-configured the data port between sensor B and data forwarding device S5, the data forwarding devices S4, S3 and S10 do not need to forward unnecessary data of the sensor, thus, preserving bandwidth and after respective countdown timers of the data forwarding devices S3, S4 and S10 expire, these data forwarding devices may enter a low power mode. In this example the data is blocked directly at the data port the sensor end node is communicatively coupled to, that is directly at data forwarding device S5.

Figure 3:
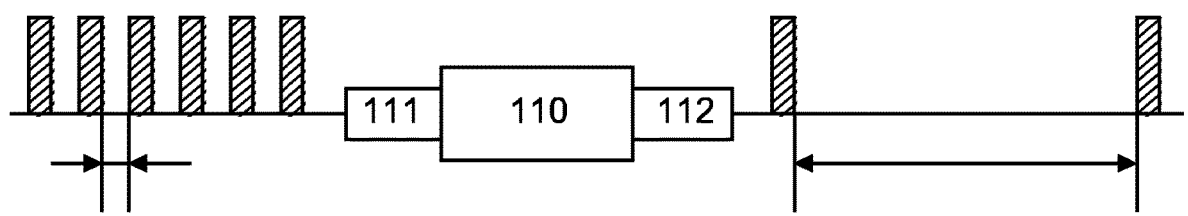
FIG. 3 shows a data forwarding component with two ports, each providing another configuration for data communication.

FIG. 3 shows a data forwarding device 110 in accordance with a preferred embodiment of the present invention. A data signal arriving at port 111 of the data forwarding device with a high frequency is blocked for a particular period of time and only passed on along port 112 at a second, lower frequency.

Figure 4:
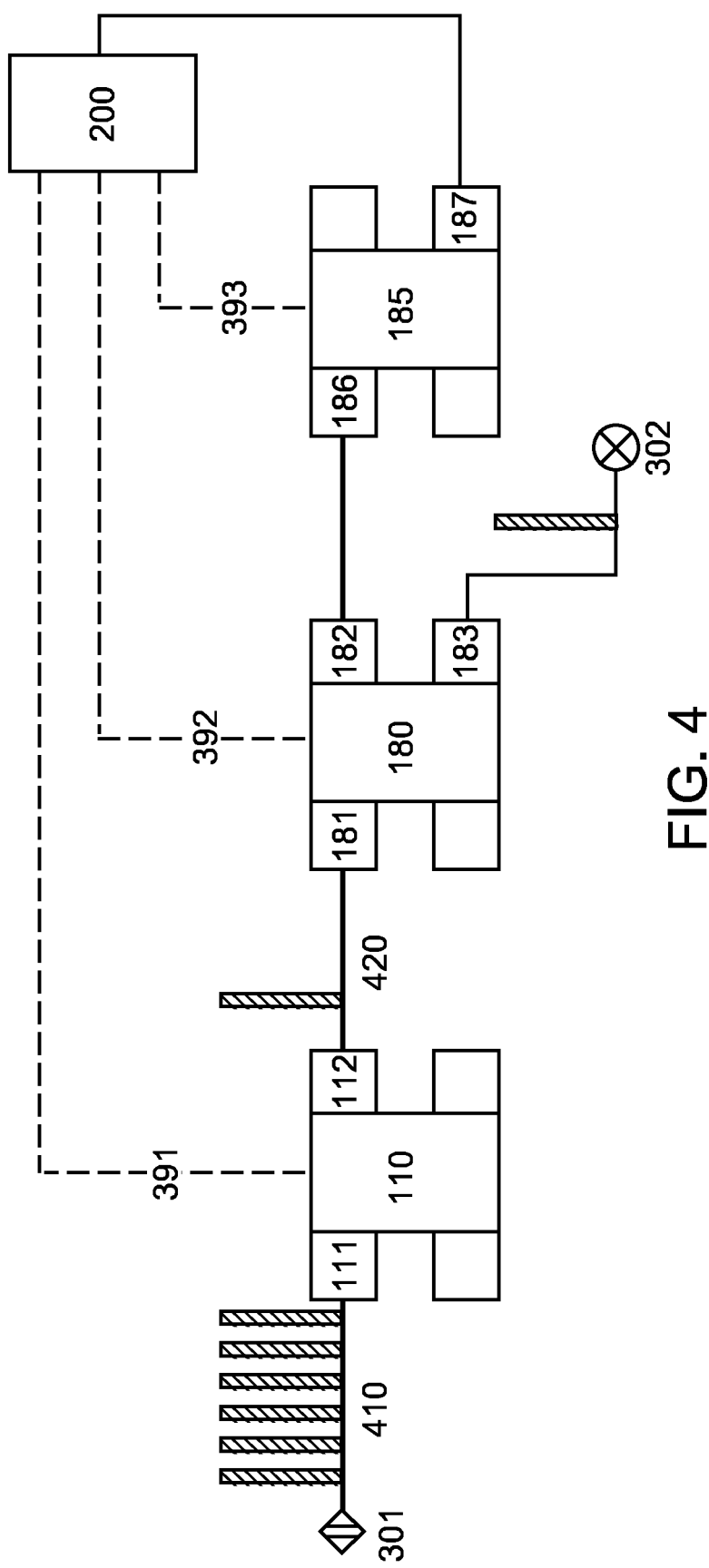
FIG. 4 shows a preferred embodiment of the present invention.

The data may, however, be blocked at any other data forwarding device or data port. For instance, to referring back to FIG. 2a the data could still be forwarded to S4 and devices attached thereto, e.g. actuator but not to S10 nor devices attached thereto. An example is shown in FIG. 4. A sensor 301 generates periodic messages 410 in quick succession with an interval of e.g. 2 seconds. The SDC system 200 inspects the application scenes in an application plan to understand the context how sensor 301 is used. The SDC system 200 creates an operation schedule in accordance with the application plan to define the periods in that the sensor signal is passed to what end destination(s). Furthermore, the schedule determines how long the sensor signal is blocked between the transmission periods. Subsequently the SDC system 200 uses the control lines 391-393 to configure the data forwarding devices 110, 180 and 185 according to the schedule. The network border device 110, e.g. a data forwarding device such as a data switch, receives the data signal 410 from sensor 301 at port 111. This data is only forwarded at a second frequency as signal 420 between port 112 and port 181 to the next data forwarding device 180 along a data path through the communication network. Data forwarding device 180 is communicatively coupled to actuator 302 via port 183 to which sensor signal 420 is passed on.

For instance, sensor 301 may be a temperature sensor and actuator 302 may control the heating system. In order to keep the temperature at a suitable level, it is enough to check the temperature every half an hour. The data paths from data forwarding device 180 to the next data forwarding device 185 along data ports 182 and 186 is blocked, for instance by programming data port 182 accordingly. Data forwarding device 185 may thus go to a low power mode to save energy for a predetermined period of time. The connection to SDC system 200 via data port 187 would then be interrupted. Instead of powering down the entire data forwarding device 185, it is also possible to power down respective data ports 186, 187.

A few examples for constantly transmitting application control components are:
  Sensors, that do not wait with transmitting data until being asked.
  Sensors, that observe and notify a constant signal such as for example an analogue signal.
  Sensors, that are connected to the network but not used in any application control scene.
  Sensors, that observe a parameter that changes very often. For example irradiance levels, rpm counts, opening and closing of doors, weather station, presence detectors such as PIR sensors or IP camera, etc.
  Instead of a sensor, a computer may periodically generate unsolicited data. For example a broadcasting time server configured for (too) short time update intervals.

Figure 5:
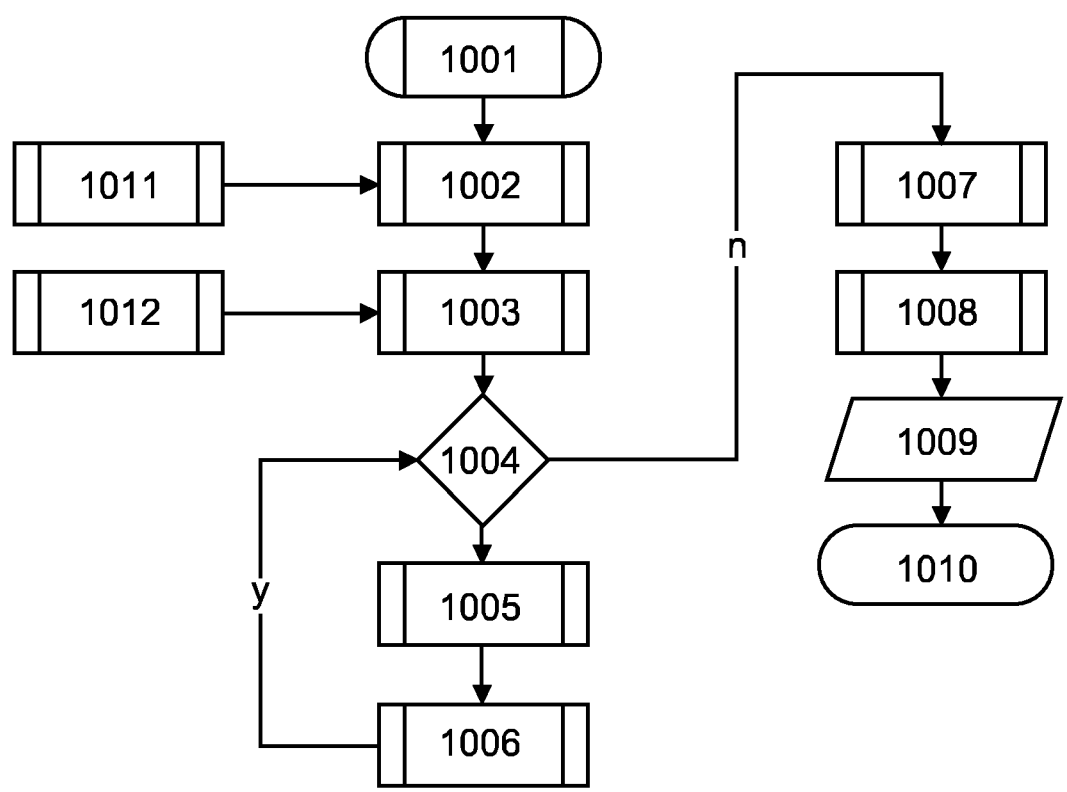
FIG. 5 shows a flow diagram of an exemplary implementation according to a preferred embodiment of the present invention.

FIG. 5 shows a flow diagram for an exemplary implementation of the method in accordance with preferred embodiment of the present invention. After starting the method 1001 at a certain instant in time, the system may optionally collect path updates 1002 of all potential paths available within the network. To be certain, that the most recent collection of paths is used, a separate process may continuously learn potential paths through the network 1011 and provide that information as additional input to the control system. The system then determines the application scene updates 1003 of all (lighting) control scenes in the (lighting) control network. A lighting scene shall define the sensors and actors that interact with each other and may define the action and duration thereof. The system maps the required application control components to the network topology by selecting a particular data path to be used for forwarding data through the network, thus defining a particular set of concrete application control scenes that is application components that communicate via distinct communication paths. To be certain, that the most recent collection of application scenes is used, a separate process 1012 may continuously learn application scenes from the application control network, e.g. by identifying reoccurring patterns. The system may iterate and analyze all other (lighting) application scenes 1004 to determine the best overall location to (un)block data per application scene with the associated time and duration. The system will subsequently map the application scene onto the communication network 1005 by defining the required paths for a predetermined period in time. The system will then select the "best" data port 1006 to achieve the desired result of the application scene according to predefined constraints, which could be a minimization of the overall data passing through the network during a certain time duration, but may include other constraints. The system will then compile all data ports 1007 determined in the previous step into one time schedule that specifies the data ports on the data-forwarding devices as well as respective start and stop times for data transmission at the respective data ports. To enhance flexibility and reduce data load for a corresponding data protocol, many options could be conceivable for such a schedule, such as different block granularity, definition of very large and short time windows, checksums, repetition, etc. The system will check and filter for a certain precedence, and avoid double definitions. An example of an arbitrary time schedule to manage the data ports on paths is shown in Table 1.

| Entry# | pathID | DFDID | PortID | BG Block Granularity | UG Unblock Granularity | Start time | Block duration | Unblock duration | repeat | Checksum |
|---|---|---|---|---|---|---|---|---|---|---|
| 1 | 1 | 110 | 112 | Minute | Seconds | t1 | 30*BG | 3*UG | 256 | CS1 |
| 2 | 1 | 180 | 183 | Minute | Seconds | t1 | 30*BG | 3*UG | 256 | CS2 |
| 8 | 7 | S5 | 5 | Hour | Minutes | t2 | 10*BG | 3*UG | 7 | CS3 |
| 9 | 7 | S4 | 11 | Hour | Minutes | t2 | 10*BG | 0*UG | 7 | CS4 |
| 10 | 7 | S3 | 7 | Hour | Minutes | t2 | 10*BG | 0*UG | 7 | CS5 |
| 11 | 7 | S11 | 4 | Hour | Minutes | t2 | 10*BG | 0*UG | 7 | CS6 |
| 15 | 8 | S5 | 3 | Hour | Minutes | t3 | 1435*BG | 5*UG | 256 | CS7 |
| 16 | 8 | S10 | 6 | Hour | Minutes | t3 | 1435*BG | 5*UG | 256 | CS8 |
| 17 | 8 | S11 | 2 | Hour | Minutes | t3 | 1435*BG | 5*UG | 256 | CS9 |

The example Table 1 defines rules for 3 paths. The rule for path 1 allows a signal 420 of 3 seconds duration every 30 minutes and is repeated indefinitely. The rule for path 7 allows signals to pass 10 hours after start t2, every day for 7 days. The rule for path 8 blocks for 23 h:55 m and from 0 h:00 m until 23 h:55 m and unblocks for 5 minutes from 23 h:55 m until 0 h:00 m and is repeated indefinitely. Entirely different examples can be constructed and are not excluded.

The system will subsequently define the appropriate data messages 1008 to be send into the control network to update 1009 the control lines "in efficio", e.g. updating the port configuration by sending respective messages via the control lines. As a result the data forward devices process instructions to configure the respective data port(s). The system finishes the update of the control lines 1010 and is restarted after a certain interval.

In a preferred embodiment of the present invention, an SDC system may align the determined time windows and thus, the frequency gateways with other applications. The data passing time window may preferably be aligned with the count-down timers of an energy saving data forwarding device.

The schedule may be executed as a default block or a default unblock operation, with the entries as inverted operation. For example: in a well-known SDN system the default operation is a blocked operation due to absent data path definitions, where the unblocked operation is a timed data path definition. Other network management systems may be implemented in a different fashion but serve the same purpose. The propagation of data over a path may be optimized by a forwarded broadcast. This means, that the data ports of a data forwarding device are configured to broadcast the data on the egress port(s) but not transmit the data back on the ingress port: this in itself is a well-known technique. Configuring data paths in itself is also a well-known process. A preferred embodiment uses a dynamic protocol, such as for example—but not limited to—the OpenFlow Software Defined Networking protocol. If the SDC system has computed a schedule, a respective data forwarding device's data port needs to be configured to (un)block traffic for a certain period.

The SDC system in accordance with a preferred embodiment of the present invention may use well known interfaces, that decide to deactivate the lookup sequence on the specific data port(s) to prevent unrequested data from being passed on to the network.

additionally, if a data path definition has already been configured, data is actively blocked at a specific data port(s).

An example how to deactivate the lookup sequence is given for the OpenFlow SDN protocol. An end node (e.g. a sensor) transmits a message to the data port of the data forwarding device it is communicatively connected to. In SDN controlled communication networks a first incoming data message will create a message to the SDN controller initiating a lookup sequence. The data forwarding device will create a so-called "message-in" packet to consult the SDN controller how to forward the data to the destination. The SDN controller replies with a "message-out" packet to instruct the data forwarding device how to pass on the data. As a first step, the SDC system configures the data forwarding device's data port to deactivate the lookup sequence. The data port is programmed with SDN commands. The maximal timeout of a data flow is 16 bits in accordance with the OpenFlow protocol specification, meaning the maximal duration of a dynamic data flow is 65 k sec=18.2 h. As a special case an idle timeout and hard timeout field may both be set to zero. This will make a data path definition "permanent" until it is actively removed. That way, it may be avoided that an SDN controller is consulted on a regular basis to periodically program a data path definition that it repeatedly required by an application control component. That way data traffic related to data path configuration may be reduced. However, the data path definition already programmed to for respective data forwarding devices will lead to a continuous forwarding of data from e.g. a sensor, meaning that network components involved in the data forwarding will persist in consuming power.

As a second step, the SDA system can learn what kind of sensor(s) is (are) involved in an application scene and how its data is required to support the application, for example, once a day. Based on this information, the SDN controller can create a data path during a time window of e.g. 10 seconds every day during which the sensor can pass its data to the SDA system.

As a result the SDC system effectively reduced traffic, such that the network can partially power down, either passively by timeouts or actively by a respective power schedule.

An example how to drop data on a specific data port is illustrated in the following for the OpenFlow SDN protocol, in accordance with a preferred embodiment of the present invention.

a) When there is no entry in the a table storing the data path definitions, also referred to as data flow definition table, packets received and addressed to a particular end node may be cached by either a "table miss" flow table entry with action "drop" or alternatively, data is dropped when there is no entry in (any of) the data flow table(s).

b) The OFPPFL_NO_PACKET_IN bit indicates that packets on a port that generates a table miss should never trigger a "packet-in message" to the controller. This means that packets from end nodes on certain data ports can be ignored and the respective data will not generate a lookup sequence from said data forwarding device all the way to the SDN controller.

c) Implementations may exploit and manipulate timeouts and how quickly they expire.

It shall be understood that SDN OpenFlow is only one implementation possibility in accordance with a preferred embodiment, other network management systems could be used instead to configure data forwarding rules, such as for example, but not limited to, SNMP, MPLS, etc.

Procedures like determining a frequency, providing data paths definitions, blocking a data port, et cetera performed by one or several units or devices can be performed by any other number of units or devices. These procedures and/or the control of the application control system in accordance with the method for controlling application control components can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A system for controlling data traffic within an application control network, the system comprising:
 a plurality of data forwarding devices within an integrated communication network;
 at least one application control component that transmits data to at least one of the plurality of data forwarding devices at corresponding first reporting frequencies of the at least one application control component; and
 a processing unit configured to:
  determine, based on an application plan, a second reporting frequency at which the data from a particular application control component of the at least one application control component is required by the application control network for operation of an application associated with the particular application control component, wherein the second reporting frequency is less than the first reporting frequency;

determine which one or more data forwarding devices of the plurality of data forwarding devices is in a path used by the particular application control component; and provide a data path configuration to the determined one or more of the plurality of data forwarding devices for opening the path provided by the one or more of the plurality of data forwarding devices at instances of time defined by the second reporting frequency and blocking the data path provided by the one or more of the plurality of data forwarding devices during time intervals between the instances of time defined by the second reporting frequency such that reports are received from the particular application control component only during the instances of time defined by the second reporting frequency while the particular application control component continues to report using the first reporting frequency.

2. The system according to claim 1, wherein the processing unit is further configured to block the data path by configuring a data port of the at least one of the plurality of the data forwarding devices to deactivate consultation with a network management control system.

3. The system according to claim 1, wherein the processing unit is further configured to block the data path by configuring a data port of the at least one of the plurality of data forwarding devices to drop data arriving at the data port when originating from the particular application control component.

4. The system according to claim 3, wherein configuring the data port of the at least one of the plurality of data forwarding devices to drop data comprises deleting a data path configuration and configuring the data port to ignore data for which no data path configuration exists.

5. The system according to claim 2, wherein the at least one of the plurality of data forwarding devices is a data forwarding device to which the particular application control component is directly communicatively coupled.

6. The system according to claim 1, wherein the processing unit is further configured to periodically update information on at least one of:
(i) the available data paths through the communication network, and
(ii) changes in the application plan.

7. The system according to claim 2, wherein the at least one of the plurality of data forwarding devices remains in an active state.

8. A method for controlling data traffic within an applications control network comprising a plurality of data forwarding devices within an integrated communication network and at least one application control component that transmits data to the at least one of the plurality of data forwarding devices at first corresponding reporting frequencies of the at least one application control component, the method comprising:

determining, based on an application plan, a second reporting frequency at which the data from a particular application control component of the at least one application control component is required by the application control network for operation of an application associated with the particular application control component, wherein the second reporting frequency is less than the first reporting frequency;

determining which one of more data forwarding devices of the plurality of data forwarding devices is in a path used by the particular application control component; and providing a data path configuration to the determined one or more of the plurality of data forwarding devices for opening the path provided by the one or more of the plurality of data forwarding devices at instances of time defined by the second reporting frequency and blocking the data path provided be the one or more of the plurality of data forwarding devices during time intervals between the instances of time defined by the second reporting frequency such that reports are received from the particular application control component only during the instances of time define by the second reporting frequency while the particular application control component continues to report using the first reporting frequency.

9. The method according to claim 8, wherein the blocking the data path further comprises configuring a data port of the at least one of the plurality of the data forwarding devices to deactivate consultation with a network management control system.

10. The method according to claim 8, wherein the blocking the data path further comprises configuring the at least one of the plurality of the data forwarding devices to drop data arriving at the data port when originating from the particular application control component.

11. The method according to claim 10, wherein configuring the data port of the at least one of the plurality of data forwarding devices to drop data comprises deleting a data path configuration and configuring the data port to ignore data for which no data path configuration exists.

12. The method according to claim 9, wherein the at least one of the plurality of data forwarding devices is a data forwarding device to which the application control component is directly communicatively coupled.

13. The method according to claim 8, wherein the method further comprises periodically updating information on at least one of:
(i) the available data paths through the communication network, and
(ii) changes in the application plan.

14. A computer program for controlling data traffic within an applications control network comprising a plurality of data forwarding devices within an integrated communication network and at least one application control component that transmits data to the network at corresponding first frequencies, without being interrogated, the computer program being executable in a processing unit, the computer program stored on a non-transitory computer readable storage medium and comprising program code means for causing the processing unit to carry out a method as defined in claim 8 when the computer program is executed in the processing unit.

* * * * *